Nov. 23, 1943. R. I. MITCHELL 2,334,785
FILING CABINET
Filed June 19, 1942 4 Sheets-Sheet 4
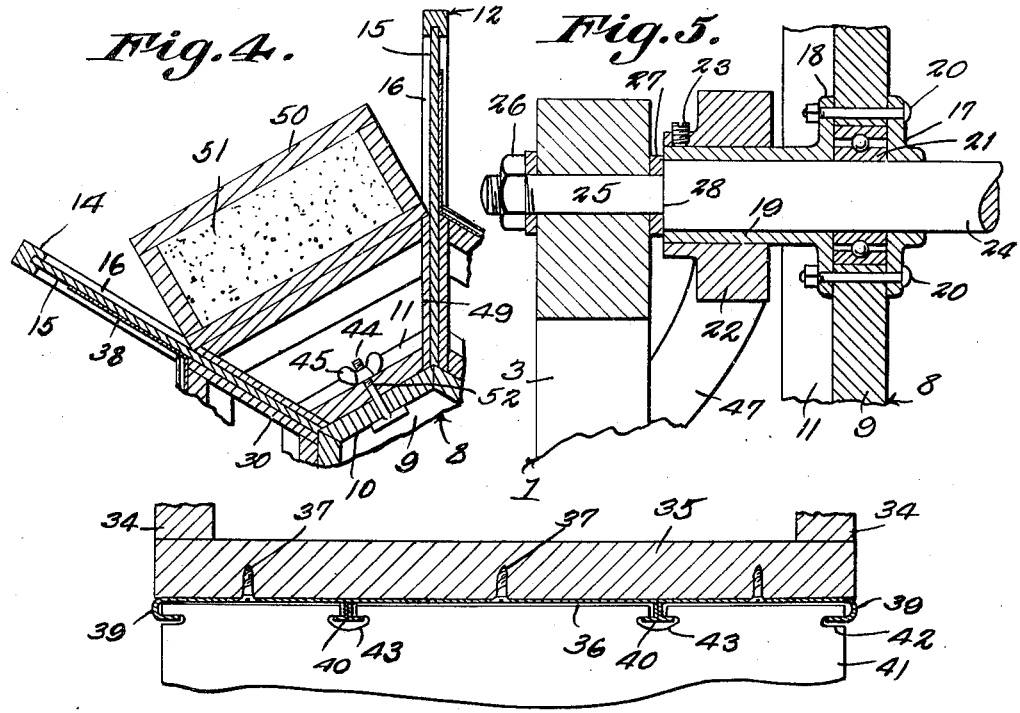
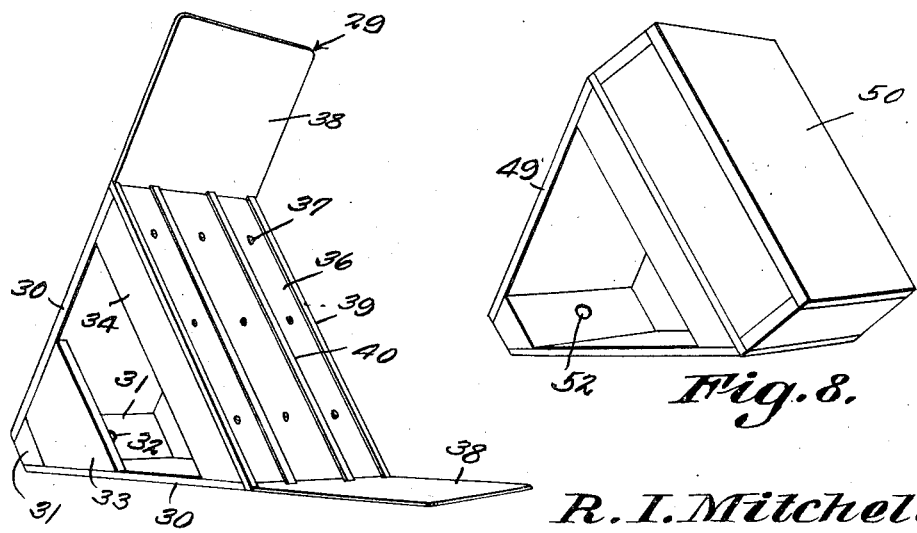
R. I. Mitchell
INVENTOR.

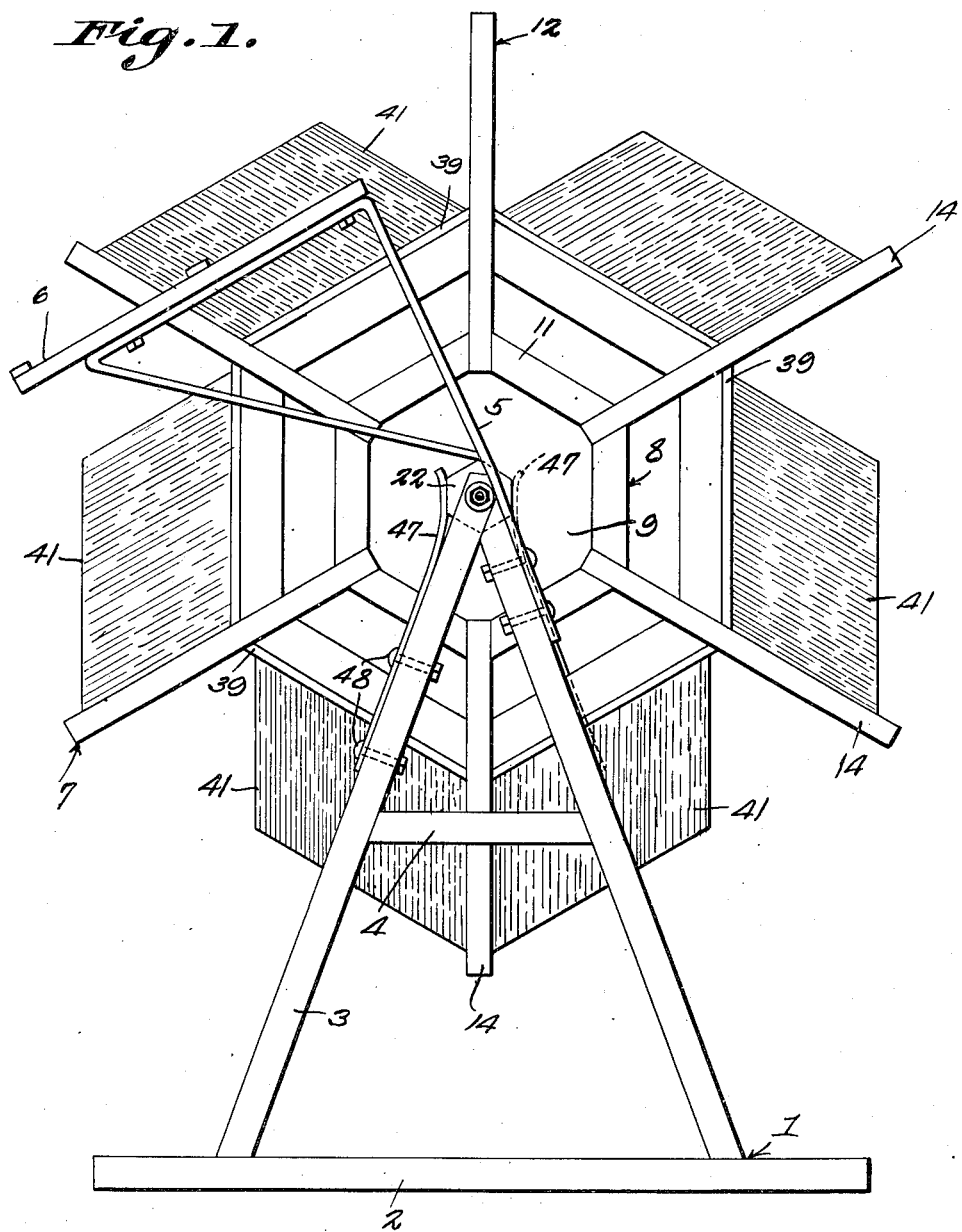

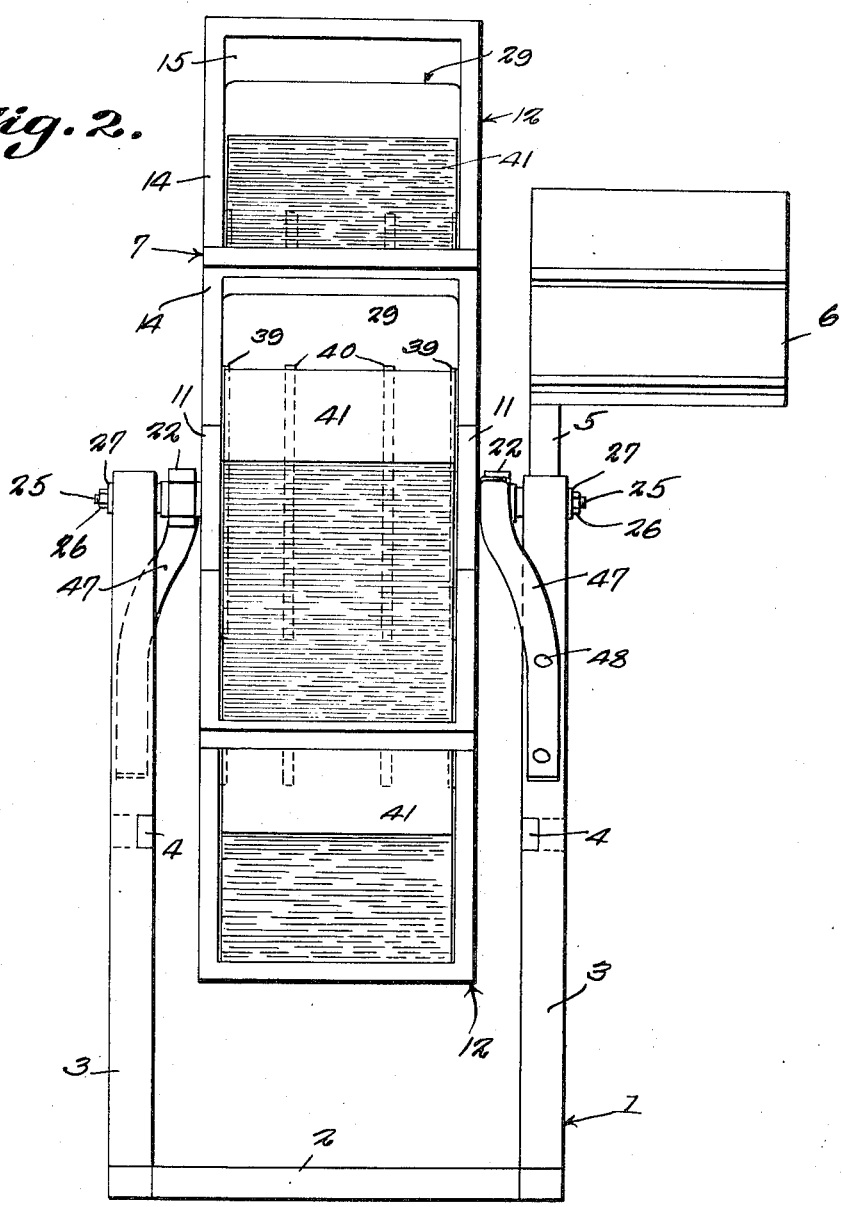

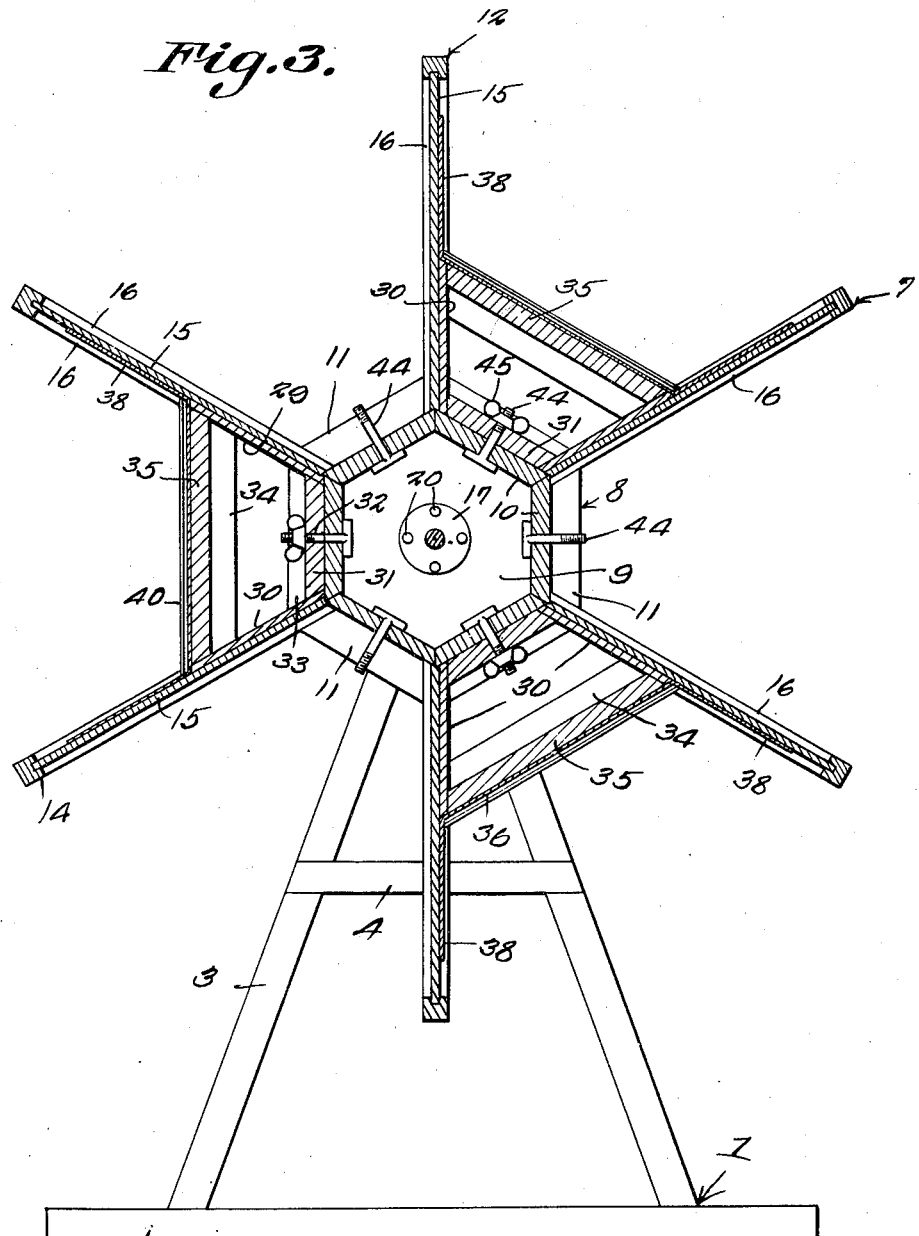

Patented Nov. 23, 1943

2,334,785

UNITED STATES PATENT OFFICE 2,334,785

FILING CABINET

Raymond I. Mitchell, Auburn, Maine

Application June 19, 1942, Serial No. 447,711

4 Claims. (Cl. 45—3)

This invention aims to provide a filing cabinet in which a wheel is mounted for rotation about a substantially horizontal axis, the wheel being shaped to receive record holders detachably, to the end that any record holder may be brought to a place where the records may be consulted conveniently whilst the holder is on the wheel. Another object of the invention is so to construct the record holders thta they may be removed from the wheel and placed readily on a table or the like, to facilitate an examination of the records, at a place remote from the wheel.

A further object of the invention is to provide appropriate means whereby the rotation of the wheel may be stopped, adjustably, at predetermined steps, so to dispose any card holder that it will be accessible to an operator, due consideration being given to the stature of the operator, and whether or not he is standing or sitting.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention, herein disclosed, may be made within the scope of what is claimed, without departing from the spirit of the invention.

In the accompanying drawings:

Fig. 1 shows, in side elevation, a device constructed in accordance with the invention;

Fig. 2 is an end view;

Fig. 3 is a vertical section, taken in a plane transverse to the axis of rotation of the wheel or carrier;

Fig. 4 is a sectional view, at right angles to the axis of rotation of the wheel or carrier, of a counterweight supplanting one of the record holders;

Fig. 5 is a transverse sectional view, taken at the axis of rotation of the wheel or carrier, parts remaining in elevation;

Fig. 6 is a transverse section through a portion of one of the record holders, a record being shown in place;

Fig. 7 is a perspective disclosing the said holder;

Fig. 8 is a perspective showing the counterweight.

In carrying out the invention, there is provided a stand 1, which may be of any desired construction. The stand 1 may include a horizontal base 2, to which are secured inverted, V-shaped uprights 3, the opposed members of each of the uprights being connected by a cross brace 4.

One of the uprights 3 preferably is provided at its upper end with a bracket 5, which supports a laterally and outwardly extended table 6, the table preferably having a slant so that the records placed upon its may be inspected readily.

The numeral 7 designates a wheel or carrier, shown as of hexagonal outline, although the wheel might take the form of some other polygon.

The wheel or carrier 7 includes a hub 8, comprising end pieces 9, preferably although not necessarily of hexagonal outline. The end pieces 9 of the hub 8 are joined together by transverse members 10 which may define a hexagon, as shown in Fig. 3. Side strips 11 are secured to the end pieces 9, and project outwardly, beyond the transverse members 10 of the hub of the wheel.

Radial spokes or partitions 12 are provided, each partition comprising a rectangular frame 14, open at its inner end, the side arms of the frame being received between adjoining strips 11, as shown in Fig. 1, and being secured to the side strips 11 and to the transverse members 10. A plate-like body 15 is secured within each frame 14, midway between the outer surfaces of the frame, to form recesses 16.

Referring to Fig. 5, a ring 17 is disposed against the inner surfaces of the end pieces 9, at each side of the wheel, and against the outer surfaces of the end pieces 9 are disposed the annular flanges 18 of outwardly projecting sleeves 19.

The flanges 18 of the sleeves 19 are joined to the rings 17 by securing elements 20, passing through the end pieces 9 of the hubs 8. If desired, ball bearings 21, or other anti-friction bearings, may be located between the flanges 18 and the rings 17.

Stops 22 are mounted for rotary adjustment on the sleeves 19, and are held in adjusted positions by such means as set screws 23, threaded into reduced portions of the stops, and engaging the sleeves 19, as shown in Fig. 5. The parts 22 are called stops, because, cooperating with parts hereinbefore described, they terminate the rotation of the carrier or wheel 7, step-by-step. The stops 22 are of polygonal outline, and are of the same outline as the wheel, the stops, therefore, being hexagonal in the present instance.

A shaft 24 extends through the rings 17, the anti-friction bearings 21, and through the sleeves 19, the shaft having, if desired, reduced portions 25, extended through the uprights 3 at the upper ends thereof, nuts 26 being threaded on the reduced parts 25 of the shaft 24, washers 27 being arranged between the uprights on the one hand, and the outer ends of the sleeves 19, and the shoulders 28 of the shaft 24, on the other hand. The construction is such that the wheel 7 is mounted to rotate on the shaft 24.

Record holders are provided and are designated generally by the numeral 29. The record holders 29 are of blunted wedge shape, as shown in Fig. 7. Each record holder 29 comprises converging, plate-like wall pieces 30 connected at their lower ends by a base piece 31 having a hole 32. The wall pieces 30 are connected, adjacent to the base bar 31, by braces 33, and they are connected, outwardly of the braces 33, by braces 34.

Tables 35 are disposed between the braces 34 and extend between the wall pieces 30. On each table 35 is secured, as shown at 37, a metal plate 36, the ends of which are extended outwardly, to form wings 38, constituting continuations of the wall pieces 30. The plates 36 have inwardly projecting hooks 39 at their outer edges, and intermediate their outer edges, the plates are provided with T-shaped ribs 40. The record may be a card 41, supplied in its outer edges with notches 42, shaped to receive the hooks 39. The cards 41 are provided, also, with openings 43, shaped for the reception of the ribs 40. Any suitable means, however, may be provided, for holding the cards 41 in place between the wings 38, and on the partition that is formed by the plate 36 and the table 35.

The record holders 29 are so shaped that they will fit in the recesses 16, between the body portions 15 of adjacent spokes 12, the base bar 31 being in contact with one of the transverse members 10 of the hub 8, as shown in Fig. 3. The means for holding the members 29 in place may be T-bolts 44, extended outwardly through the hub members 10, and through the base bars 31 of the record holders, nuts 45 being threaded on the bolts, and being adapted to engage the base bars 31 of the record holders.

The wheel 7 may be rotated, to bring any record holder 29 to such a distance about the base 2 that the record holder will be readily accessible to an examiner, regardless of whether he is tall or short, standing or sitting. The record holders 29 are so shaped, as shown in Fig. 7, that they can be laid down on a desk, table or the like, at a remote place, the bolt and nut structures 44—45 having been released. When the record holder 29 is in the position of Fig. 7, the cards 41 tend to gravitate to a position in which they can be inspected readily. The record holders 29, when attached to the wheel 7, may be inspected on the wheel, and when removed from the wheel, as in Fig. 7, they may be located conveniently with respect to merchandise which is being indexed, for example. Other uses for the structure will be appreciated.

It is desirable to have the wheel or carrier 7 come to rest in any one of a plurality of positions, so that the record holders 29 may be accessible to an operator. It is for this purpose that the so-called stops 22 of Fig. 5 are provided, the stops being of polygonal shape, as shown in Fig. 1. Spring means for cooperation with the stops 22 is provided, and that means may be resilient tongues 47, secured at 48 to the outer edges of the uprights 3, the tongues curving inwardly and extending upwardly, as in Fig. 2, and bearing against the bounding edges of the stop 22. The tongue 47 on one upright 3 bears against one side of the corresponding stop 22, and the tongue of the other upright bears against the opposite side of its individual stop. It will be seen, therefore, as is shown in Fig. 1, that the wheel or carrier 7 is held by a double and opposed grip, yieldably, against rotation.

When a record holder 29 is taken out of the wheel 7, the center of mass of the wheel and the card holders is not coincident with the axis of rotation of the shaft 24. Stated in more simple language, the wheel is out of balance. That difficulty may be remedied by means of a counterweight structure 49, shown in Fig. 8, and of the same blunted, wedge-like shape as the card holder 29. The counterweight structure may include a receptacle 50, adapted to contain sand 51, or other material.

When the counterweight structure 49 replaces one of the record holders 29 in the wheel 7, it is held in place by the bolt and nut device 44—45, there being a hole 52 in the inner end of the counterweight structure, for the reception of the bolt.

The device is simple in construction but it affords a convenient means whereby groups of cards may be brought into place for convenient inspection, by the mere rotation of a wheel. The card holders are adapted for use, not only on the wheel, but at a remote place, as has been pointed out hereinbefore.

It will be noted that since the stops 22 may be rotated on the sleeves 19, and be held in place by the set screws 23, the operator can make such an adjustment, considering the height of his line of vision, that the parts 41 always will be accessible and readily visible.

Having thus described the invention, what is claimed is:

1. A filing cabinet comprising a stand, a carrier mounted to rotate about a substantially horizontal axis on the stand and comprising radial compartments which are open at their outer ends, a stop having bounding edges disposed at an angle to each other, a yieldable means supported by the stand and engageable with any of said bounding edges, to hold the carrier in positions to which it may have been rotated step by step, the stop being mounted for rotary adjustment on the carrier, thereby to dispose any compartment, by an amount of rotation less than that resulting from any step, in such position that an operator, regardless of the height of his line of vision, may examine any compartment readily, and means for holding the stop releasably fixed in any position to which it may have been rotated with respect to the carrier.

2. In a filing cabinet, a stand, a carrier mounted to rotate on the stand, about a horizontal axis, record holders mounted on the carrier, circumferentially thereof, and means for releasably stopping the rotation of the carrier at a plurality of stations, said means including a stop having a polygonal portion, means for mounting the stop for rotary adjustment on the carrier, means for fixing the stop in any position to which it may have been rotated, and a yieldable means carried by the stand and bearing on the polygonal portion of the stop, the rotary adjustment of the stop affording an adjustment of any record holder with respect to the line of the operator's sight, by a distance less than that resulting from the engagement between the yieldable means and any two bounding edges of the polygonal portion.

3. A filing cabinet comprising a carrier mounted to rotate about a substantially horizontal axis and including radial spokes, removable record holders and a removable counterweight, each shaped for interchangeable mounting between adjoining spokes, and means for retaining the record holder and the counterweight releasably on the carrier.

4. In a filing cabinet, a rotor comprising a hub, means for mounting the hub for rotation about a substantially horizontal axis, substantially wedge shaped record holders, and means for securing the holders detachably to the periphery of the hub: each holder comprising wings which diverge radially of the hub, and a table connecting the wings in spaced relation to the outer ends of the wings, and means for mounting card records on the table, between the outer portions of the wings, for swinging movement circumferentially of the hub and for sliding movement along the table, between the outer portions of the wings, the divergence of the wings being sufficient so that when the holder is detached, and when one wing is supported horizontally, the records will lie in a pile on the outer portion of said one wing, leaving the uppermost record visible below the outer portion of the other wing, even though the holder may carry a maximum load of records.

RAYMOND I. MITCHELL.